(12) United States Patent
Fazeli et al.

(10) Patent No.: US 11,015,671 B2
(45) Date of Patent: May 25, 2021

(54) DUAL-STAGE, MIXED GAS/FLUID SHOCK STRUT SERVICING

(71) Applicant: GOODRICH CORPORATION, Charlotte, NC (US)

(72) Inventors: Amir Fazeli, Mississauga (CA); Matthew R Gomez, San Diego, CA (US); Adnan Cepic, Mississauga (CA); Susanne M Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 243 days.

(21) Appl. No.: 16/210,662

(22) Filed: Dec. 5, 2018

(65) Prior Publication Data

US 2019/0376576 A1 Dec. 12, 2019

Related U.S. Application Data

(60) Provisional application No. 62/682,636, filed on Jun. 8, 2018.

(51) Int. Cl.
| | |
|---|---|
| *B64F 5/40* | (2017.01) |
| *F16F 9/32* | (2006.01) |
| *B64F 5/60* | (2017.01) |
| *B64F 5/50* | (2017.01) |
| *B64C 25/60* | (2006.01) |
| *F16F 9/02* | (2006.01) |
| *G01M 17/04* | (2006.01) |

(52) U.S. Cl.
CPC .............. *F16F 9/3271* (2013.01); *B64F 5/40* (2017.01); *B64F 5/60* (2017.01); *B64C 25/60* (2013.01); *B64F 5/50* (2017.01); *F16F 9/0209* (2013.01); *F16F 9/3235* (2013.01); *F16F 2230/46* (2013.01); *G01M 17/04* (2013.01)

(58) Field of Classification Search
CPC ...... F16F 9/3271; F16F 9/0209; F16F 9/3235; F16F 2230/46; F16F 9/063; F16F 9/486; B64F 5/60; B64F 5/40; B64F 5/50; B64C 25/60; G01M 17/04
See application file for complete search history.

(56) References Cited

U.S. PATENT DOCUMENTS 6,676,076 B1 * 1/2004 Davies .................... B64C 25/60
188/314
9,446,859 B2 9/2016 Fazeli et al.
(Continued)

FOREIGN PATENT DOCUMENTS

| EP | 3118111 | 1/2017 |
| EP | 3165456 | 5/2017 |
| WO | 2014184521 | 11/2014 |

OTHER PUBLICATIONS

European Patent Office, European Search Report dated Oct. 16, 2019 in Application No. 19179037.7.

*Primary Examiner* — Ryan J. Walters
(74) *Attorney, Agent, or Firm* — Snell & Wilmer L.L.P.

(57) ABSTRACT

A method for servicing a dual-stage, mixed gas/fluid shock strut may comprise measuring a servicing temperature, charging a secondary gas chamber with compressed gas, wherein a secondary chamber pressure corresponds to the servicing temperature, pumping oil into a primary chamber of the shock strut, and charging the primary chamber with compressed gas.

20 Claims, 10 Drawing Sheets

(56) References Cited

U.S. PATENT DOCUMENTS

| | | |
|---|---|---|
| 9,618,075 B2 | 4/2017 | Martin et al. |
| 9,915,314 B2 | 3/2018 | Fazeli et al. |
| 10,272,993 B2* | 4/2019 | Fazeli ................... B64F 5/40 |
| 2016/0101877 A1* | 4/2016 | Shepherd ................ B64F 5/60 29/402.18 |
| 2017/0008648 A1 | 1/2017 | Pountney et al. |
| 2017/0130796 A1 | 5/2017 | Fazeli et al. |
| 2019/0011009 A1* | 1/2019 | Fazeli ................. F16F 9/3292 |

* cited by examiner

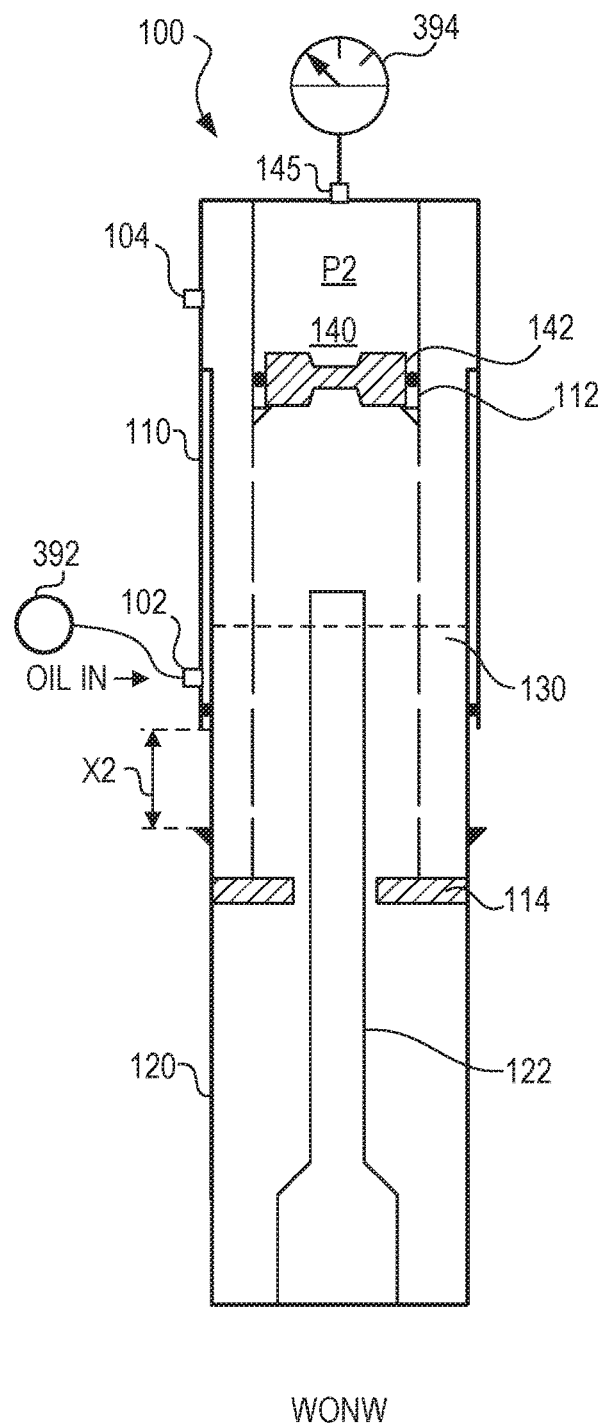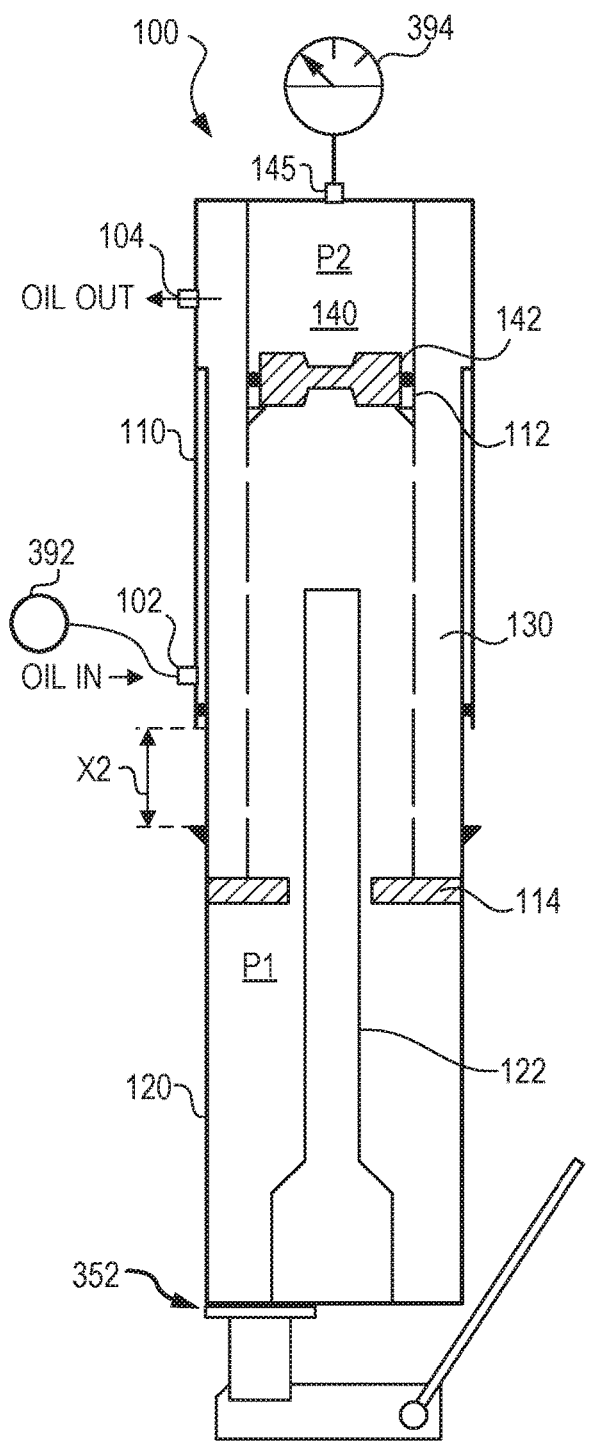
FIG. 3E
FIG. 3F

400

| | Temperature (°C) | | |
|---|---|---|---|
| Pressure | -30 | 20 | 50 |
| P2 [psig] | 1112 | 1429 | 1632 |

FIG. 4

DUAL-STAGE, MIXED GAS/FLUID SHOCK STRUT SERVICING

CROSS REFERENCE TO RELATED APPLICATIONS

This application claims priority to, and the benefit of, U.S. Provisional Patent Application Ser. No. 62/682,636 entitled "DUAL-STAGE, MIXED GAS/FLUID SHOCK STRUT SERVICING," filed on Jun. 8, 2018. The '636 application is hereby incorporated by reference in its entirety for all purposes.

FIELD

The present disclosure relates to landing gear, and more particularly, to methods for servicing shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Functionality and performance of a landing gear shock strut depends on internal gas and oil levels. Gas pressure and oil volume are maintained within a design envelope to ensure that the landing gear functionality is within an acceptable range.

SUMMARY

A method for servicing a dual-stage, mixed gas/fluid shock strut is disclosed, comprising measuring a servicing temperature, charging a secondary gas chamber with a first quantity of compressed gas, wherein a secondary chamber pressure corresponds to the servicing temperature, pumping an oil into a primary chamber of the dual-stage, mixed gas/fluid shock strut, and charging the primary chamber with a second quantity of compressed gas.

In various embodiments, the primary chamber is charged with the second quantity of compressed gas until the secondary chamber pressure corresponds to the servicing temperature as indicated by a secondary chamber pressure servicing chart.

In various embodiments, the method further comprises extending the dual-stage, mixed gas/fluid shock strut in response to the pumping, wherein the dual-stage, mixed gas/fluid shock strut extends such that a shock strut extension and the secondary chamber pressure match an oil servicing reference curve.

In various embodiments, the method further comprises extending the dual-stage, mixed gas/fluid shock strut to a shock strut extension corresponding to the secondary chamber pressure, in accordance with an oil servicing reference curve, wherein the oil is pumped into the dual-stage, mixed gas/fluid shock strut until a primary chamber pressure is equal to the secondary chamber pressure.

In various embodiments, the oil servicing reference curve is provided in the form of at least one of a series of curves or a series of tables for various servicing temperatures.

In various embodiments, the primary chamber is charged with the second quantity of compressed gas until a primary chamber pressure and a shock strut extension corresponds to a gas servicing reference curve.

In various embodiments, the method further comprises releasing an existing gas from the primary chamber.

In various embodiments, the method further comprises releasing an existing gas from the secondary gas chamber.

In various embodiments, the method further comprises releasing an existing oil from the primary chamber.

A method for servicing a dual-stage, mixed gas/fluid shock strut is disclosed, comprising charging a secondary gas chamber with a first quantity of compressed gas, wherein a secondary chamber pressure corresponds to a servicing temperature, pumping oil into a primary chamber of the dual-stage, mixed gas/fluid shock strut, wherein the dual-stage, mixed gas/fluid shock strut extends in response to the oil being pumped into the primary chamber until a first shock strut extension and the secondary chamber pressure match a primary chamber oil servicing reference curve, and charging the primary chamber with a second quantity of compressed gas until a second shock strut extension and a primary chamber pressure match a gas servicing reference curve.

In various embodiments, at least one of the primary chamber oil servicing reference curve and the gas servicing reference curve correspond to the servicing temperature.

In various embodiments, the method further comprises measuring the servicing temperature.

In various embodiments, the method further comprises releasing a first existing gas from the primary chamber and releasing a second existing gas from the secondary gas chamber.

In various embodiments, the method further comprises draining an existing oil from the primary chamber.

A method for servicing a dual-stage, mixed gas/fluid shock strut is disclosed, comprising charging a secondary gas chamber with a first quantity of compressed gas, wherein a secondary chamber pressure corresponds to a servicing temperature, circulating oil through a primary chamber of the dual-stage, mixed gas/fluid shock strut via an oil charge port and an oil bleed port, extending the dual-stage, mixed gas/fluid shock strut, using a servicing tool, to a shock strut extension corresponding to the secondary chamber pressure according to an oil servicing reference curve, closing the oil bleed port, pumping the oil into the primary chamber until the secondary chamber pressure reaches a pre-determined pressure, closing the oil charge port, extending the dual-stage, mixed gas/fluid shock strut to a fully extended position, and charging the primary chamber with a second quantity of compressed gas until a shock strut extension and a primary chamber pressure match a gas servicing reference curve.

In various embodiments, at least one of the oil servicing reference curve and the gas servicing reference curve correspond to the servicing temperature.

In various embodiments, the method further comprises measuring the servicing temperature.

In various embodiments, the pre-determined pressure is equal to the secondary chamber pressure.

In various embodiments, the method further comprises releasing a first existing gas from the primary chamber and releasing a second existing gas from the secondary gas chamber.

In various embodiments, the method further comprises draining an existing oil from the primary chamber.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 3E illustrates a schematic view of the dual-stage, mixed gas/fluid shock strut with an oil pump pumping oil into an oil chamber of the shock strut and the shock strut extended to a shock strut extension of X2 in response to the oil being pumped into the primary chamber under weight-on-wheels conditions, in accordance with various embodiments;

FIG. 3F illustrates a schematic view of the dual-stage, mixed gas/fluid shock strut with an oil pump circulating oil through a primary chamber of the shock strut and the shock strut extended to a shock strut extension of X2 in response to a servicing tool extending the shock strut under weight-off-wheels conditions, in accordance with various embodiments;

FIG. 4 illustrates an exemplary secondary chamber pressure servicing chart, in accordance with various embodiments;

Figure 1A:
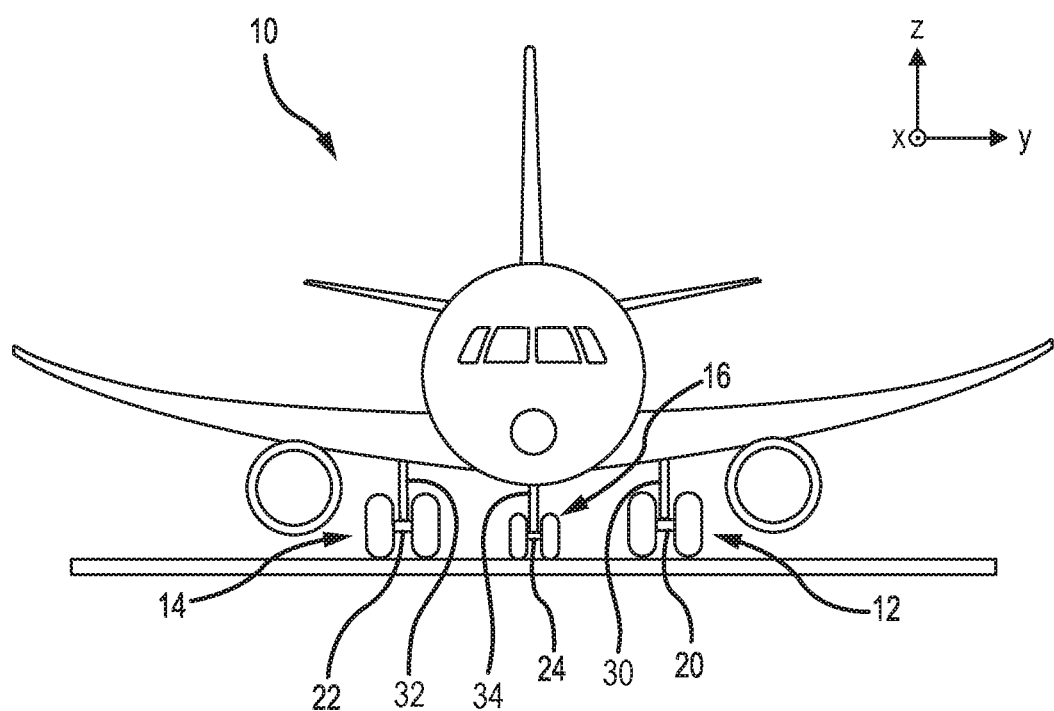
FIG. 1A illustrates an aircraft having landing gear in a deployed position, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Methods for servicing a dual-stage, mixed gas/fluid shock strut are provided herein. The methods, as described herein, may be useful for servicing a shock strut both weight on wheels (WONW), such as when an aircraft is supported by its wheels on the ground, and weight off wheels (WOFFW), such as when an aircraft is suspended in the air (e.g., aircraft on jacks). The methods, as described herein, may be useful for servicing a shock strut in a wide range of ambient temperatures. Since the effects of temperature on the shock strut internal fluid levels have been taken into account in deriving the servicing tables/charts, as described herein, the shock strut may be serviced to the nominal levels of oil and gas, regardless of ambient temperature. The methods, as described herein may provide a more time-efficient servicing, since the oil is serviced at a high pressure which may allow for a less-extensive bleeding procedure and minimal or no shock strut cycling during the oil servicing.

With reference to FIG. 1A, an aircraft 10 in accordance with various embodiments may include landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off and land without damage. Landing gear 12 may include shock strut 30 and wheel assembly 20. Landing gear 14 may include shock strut 32 and wheel assembly 22. Landing gear 16 may include shock strut 34 and nose wheel assembly 24.

Figure 1B:
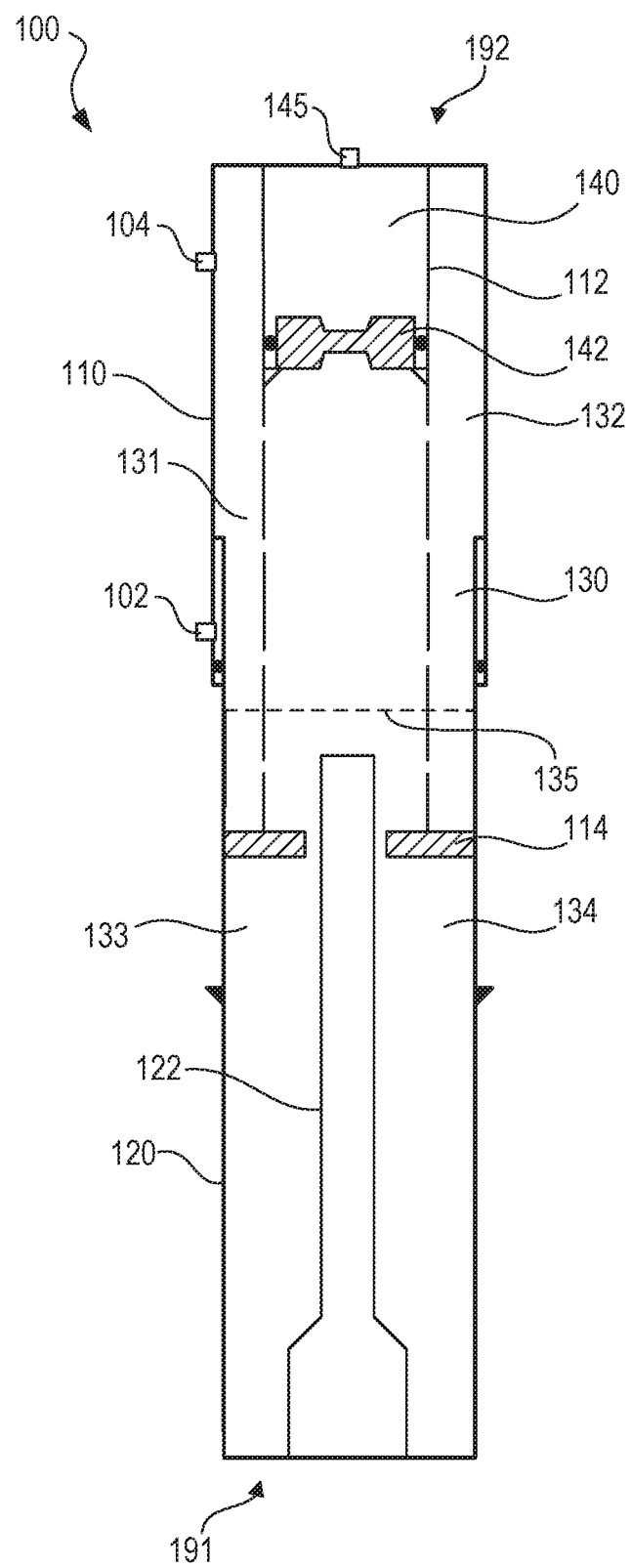
FIG. 1B illustrates a schematic view of a dual-stage, pressure-activated, mixed fluid/gas shock strut at a stroke of zero (0) (in the fully extended position), in accordance with various embodiments.

With reference to FIG. 1B, a dual-stage, pressure-activated, mixed gas/fluid shock strut (shock strut) 100 is illustrated, in accordance with various embodiments. Shock strut 100 may be similar to shock strut 30, shock strut 32, and/or shock strut 34 of FIG. 1A, in accordance with various embodiments. Shock strut 100 may comprise a strut cylinder 110 and a strut piston 120. Strut piston 120 may be operatively coupled to strut cylinder 110 as described herein. Strut cylinder 110 may be configured to receive strut piston 120 in a manner that allows the two components to telescope together and absorb and dampen forces transmitted thereto. Shock strut 100 may comprise a first end 191 and a second end 192. In various embodiments, a liquid, such as a hydraulic fluid and/or oil may be located within strut cylinder 110. Further, a gas, such as nitrogen or air, may be located within strut cylinder 110. Strut cylinder 110 and strut piston 120 may, for example, be configured to seal such that fluid contained within strut cylinder 110 is prevented from leaking as strut piston 120 translates relative to strut cylinder 110.

Shock strut 100 may consist of a low pressure, primary chamber 130 in which oil and gas can mix. In this regard, a volume of gas (also referred to herein as a primary chamber gas volume) 131 and a volume of oil (also referred to herein as an oil volume) 133 may be contained within primary chamber 130. In this regard, the portion of primary chamber 130 containing the primary chamber gas volume 131 may be referred to herein as a primary gas chamber 132. Similarly, the portion of primary chamber 130 containing the oil volume 133 may be referred to herein as an oil chamber 134. Dashed line 135 represents the level of the oil volume 133, or the interface between the oil chamber 134 and the primary gas chamber 132. Stated differently, the oil volume 133 may be located below dashed line 135 and primary chamber gas volume 131 may be located above dashed line 135. In this regard, the interface between the oil chamber 134 and the primary gas chamber 132 may move relative to primary chamber 130 depending on the position of strut piston 120 relative to strut cylinder 110. Shock strut 100 may further consist of a high pressure, secondary gas chamber 140. Secondary gas chamber 140 may be separated from primary gas chamber 132 via a separator piston 142.

An orifice support tube 112 may be positioned within primary chamber 130. Orifice support tube may at least partially define secondary gas chamber 140. Separator piston 142 may be positioned within orifice support tube 112 and may be configured to translate relative thereto. In various embodiments, separator piston 142 may be positioned outside of orifice support tube 112. FIG. 1B illustrates separator piston 142 at a minimum compression stroke (also referred to as being "bottomed out"). In various embodiments, separator piston 142 may be located at a minimum compression stroke when shock strut 100 is in the fully extended position (i.e., at a shock strut stroke of zero). An orifice plate 114 may be coupled to orifice support tube 112. Metering pin 122 may translate with strut piston 120 with respect to orifice plate 114.

Figure 1C:
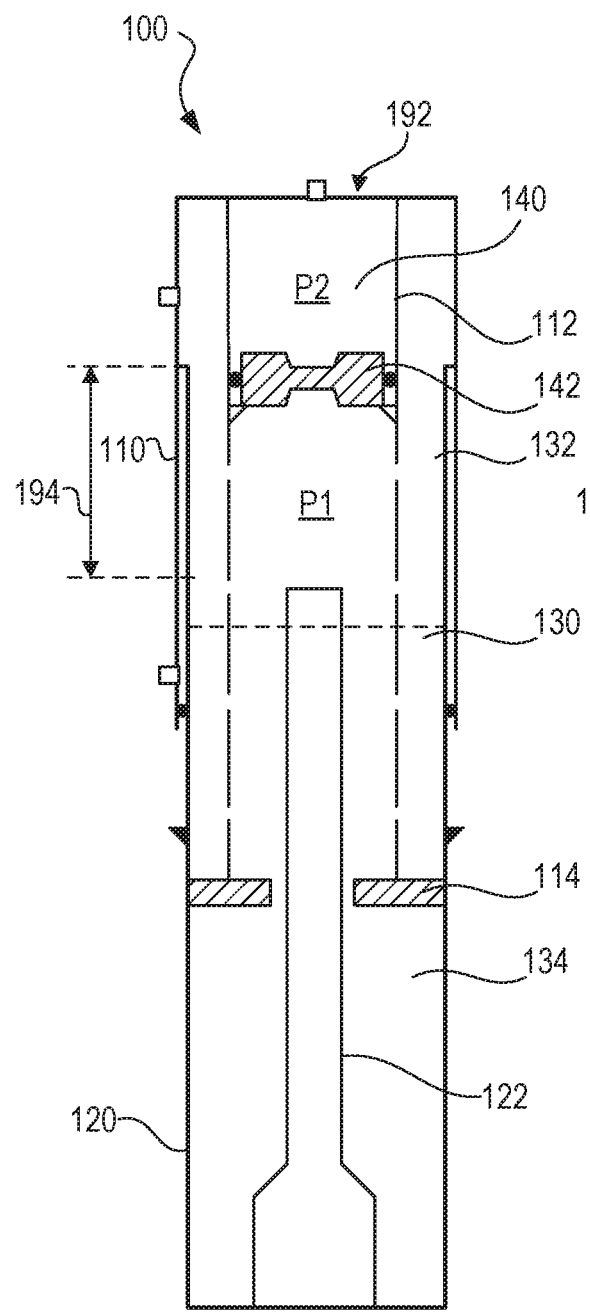
FIG. 1C illustrates a schematic view of the dual-stage, pressure-activated, mixed fluid/gas shock strut of FIG. 1B at a secondary gas chamber activation stroke, in accordance with various embodiments.
Figure 1D:
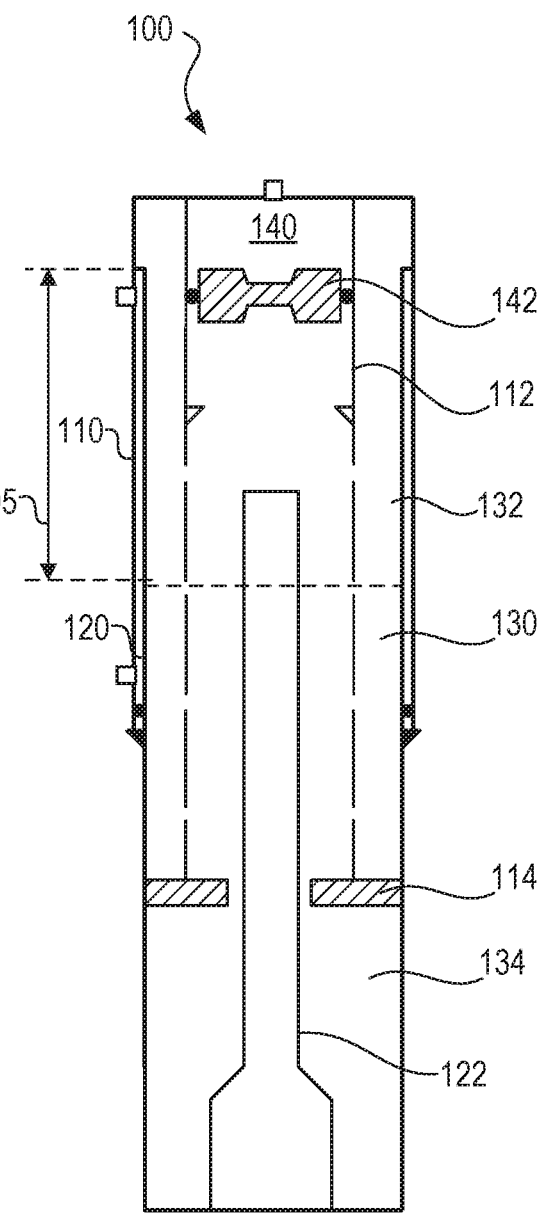
FIG. 1D illustrates a schematic view of the dual-stage, pressure-activated, mixed fluid gas shock strut of FIG. 1B at a maximum stroke (i.e., in the fully compressed position), in accordance with various embodiments.

In various embodiments, shock strut 100 may be installed onto a landing gear of an aircraft. During a landing event, shock strut 100 may be compressed wherein strut piston 120 translates into strut cylinder 110. During the landing, the shock strut may initially function as a single-stage, mixed fluid gas shock strut by metering oil through orifice plate 114 and compressing the primary chamber gas volume 131. The primary gas chamber 132 compression may continue until the secondary gas chamber 140 is pressure activated. As illustrated in FIG. 1C, this occurs when the primary chamber gas pressure P1 is greater than the secondary chamber gas pressure P2 at a shock strut stroke 194, of between zero and the maximum shock strut stroke. Separator piston 142 may translate towards second end 192 in response to primary chamber gas pressure P1 being greater than the secondary chamber gas pressure P2. Once the secondary gas chamber 140 is activated, further compression of the shock strut may compress the gas in the secondary gas chamber 140, as illustrated in FIG. 1D. FIG. 1D illustrates shock strut 100 in a fully compressed position, or at a maximum shock strut stroke 195.

With reference to FIG. 1B, shock strut 100 may include an oil fill port 102. Oil fill port 102 may be in fluid communication with primary chamber 130. Shock strut 100 may include a primary chamber charge/discharge port 104. Primary chamber charge/discharge port 104 may be referred to herein as an oil bleed port, particularly when the primary chamber charge/discharge port 104 is used to bleed oil from primary chamber 130. Primary chamber charge/discharge port 104 may be in fluid communication with primary chamber 130. Shock strut 100 may include a secondary chamber gas charge/discharge port 145. Secondary chamber gas charge/discharge port 145 may be in fluid communication with secondary gas chamber 140.

Although illustrated as having an oil fill port 102 and a primary chamber charge/discharge port 104, it is contemplated herein that shock strut 100, in various embodiments, may comprise three separate ports in fluid communication with primary chamber 130 (e.g., a designated oil fill port, a designated oil drain port, and a gas charge/discharge port), and in various embodiments, and in various embodiments, may comprise any number of ports in fluid communication with primary chamber 130 for gas and oil servicing.

A method of servicing such a dual-stage, pressure activated, mixed gas/fluid shock strut (e.g., shock strut 100), is provided herein, in accordance with various embodiments.

Figure 2:
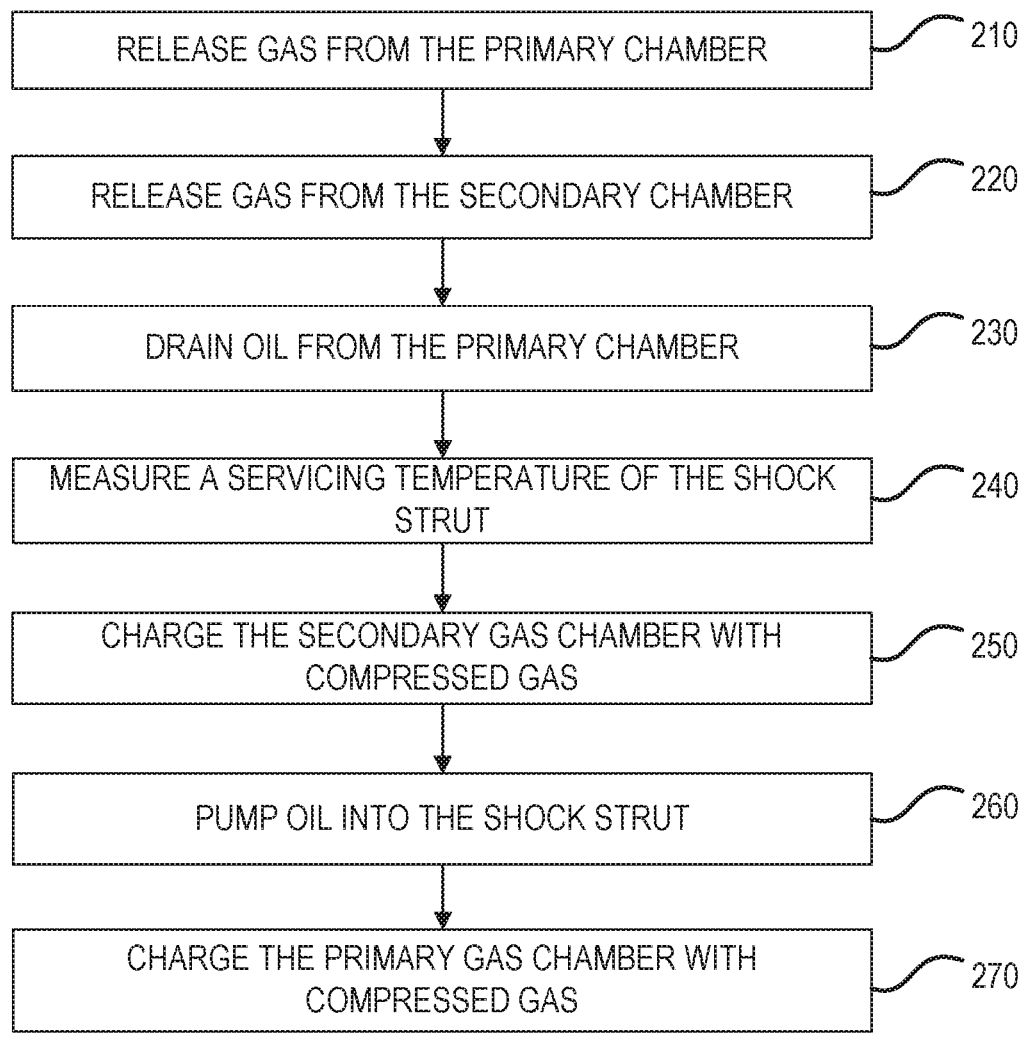
FIG. 2 illustrates a method for servicing a dual-stage, mixed gas/fluid shock strut, in accordance with various embodiments.

With reference to FIG. 2, a method 200 for servicing a shock strut is provided, in accordance with various embodiments. Method 200 may be for servicing a shock strut under WONW conditions. Method 200 may be for servicing a shock strut under WOFFW conditions. With combined reference to FIG. 3A and FIG. 2, method 200 includes releasing gas from the primary chamber (step 210). Step 210 may include releasing gas (also referred to herein as a first existing gas) from primary chamber 130 via primary chamber charge/discharge port 104. Method 200 may include releasing gas from the secondary gas chamber (step 220). Step 220 may include releasing gas (also referred to herein as a second existing gas) from secondary gas chamber 140 via secondary chamber gas charge/discharge port 145. Method 200 may include draining oil (also referred to herein as an existing oil) from the primary chamber (step 230). Step 230 may include draining oil from primary chamber 130 via primary chamber charge/discharge port 104.

Figure 3A:
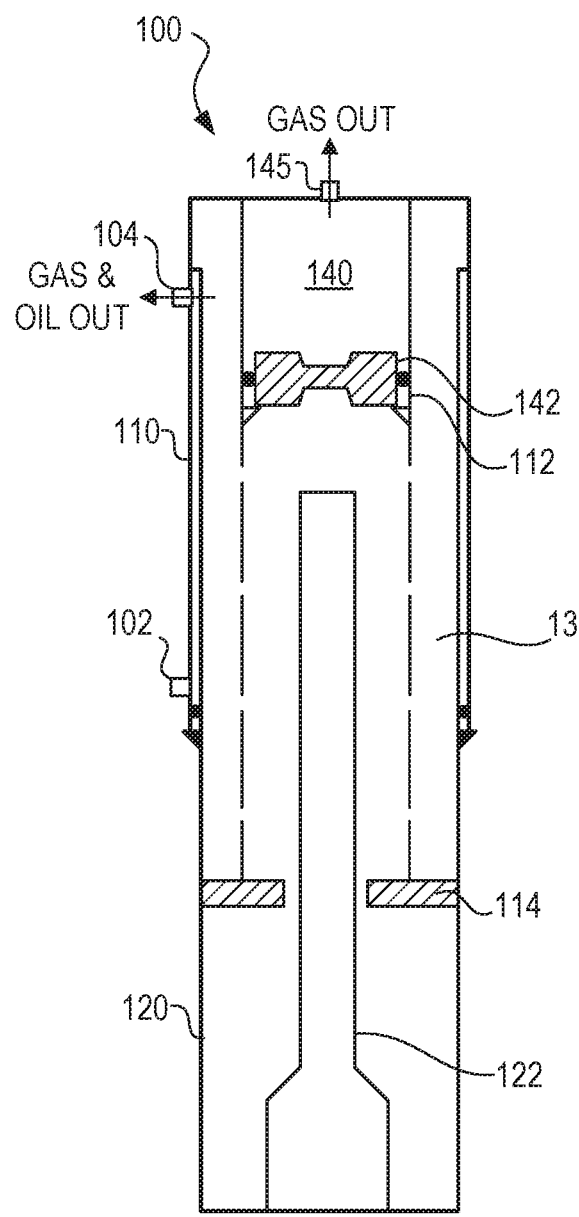
FIG. 3A illustrates a schematic view of the dual-stage, mixed gas/fluid shock strut with gas and oil released from the primary chamber and gas released from the secondary chamber under weight-on-wheel conditions, in accordance with various embodiments.
Figure 3B:
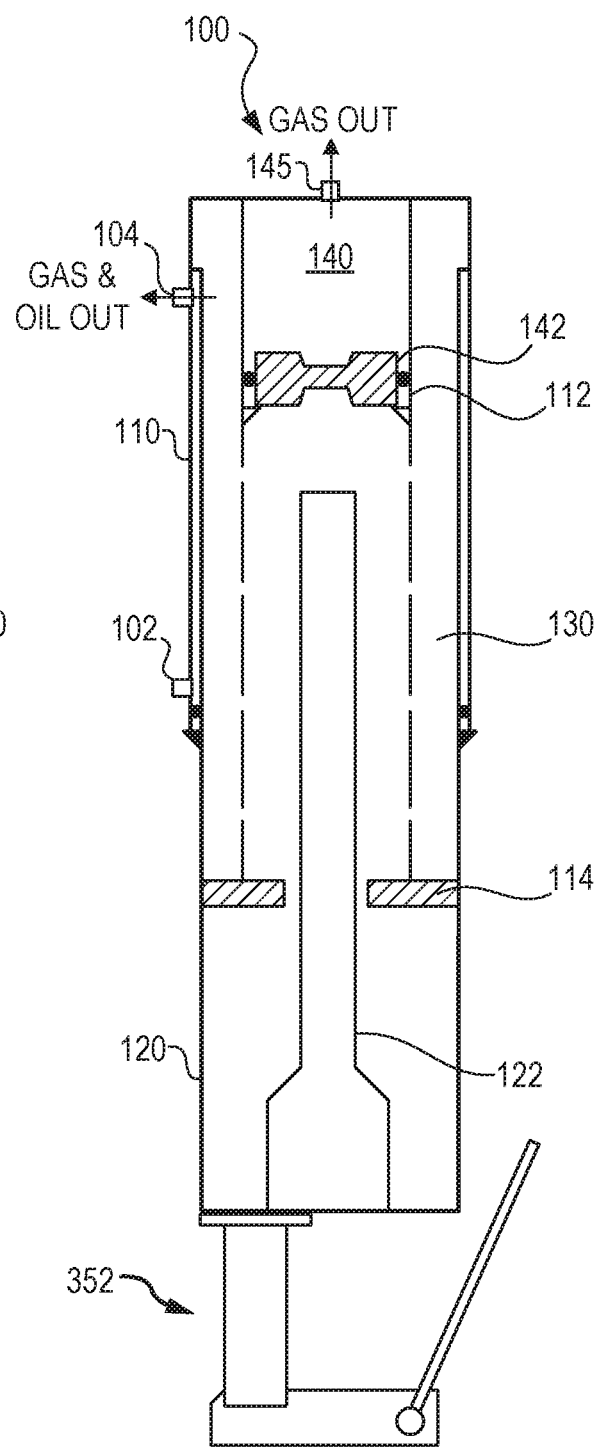
FIG. 3B illustrates a schematic view of the dual-stage, mixed gas/fluid shock strut with gas and oil released from the primary chamber and the secondary chamber under weight-off-wheel conditions, in accordance with various embodiments.

FIG. 3A illustrates shock strut 100 in a fully compressed position with gas released from primary chamber 130, with gas released from secondary gas chamber 140, and with oil drained from primary chamber 130. Shock strut 100 may compress to a fully compressed position with oil drained from primary chamber 130, as well as gas released from both primary chamber 130 and secondary gas chamber 140. If step 210, step 220, and step 230 are performed WONW, the shock strut may automatically compress to a fully compressed position due to the weight of the aircraft acting on shock strut 100. If step 210, step 220, and step 230 are performed WOFFW, method 200 may further include compressing the shock strut to a fully compressed position using a servicing tool 352, as illustrated in FIG. 3B. Servicing tool 352 may be used to restrain or hold shock strut 100 in the fully compressed position. In various embodiments, servicing tool 352 is a jack.

Method 200 may include measuring a servicing temperature of the shock strut (step 240). Step 240 may include measuring a surface temperature of shock strut 100. Step 240 may include measuring an ambient temperature in close proximity to shock strut 100. Step 240 may be performed with a temperature sensor. Step 240 may be performed with a thermometer, or any other suitable device for measuring temperature.

Figure 3C:
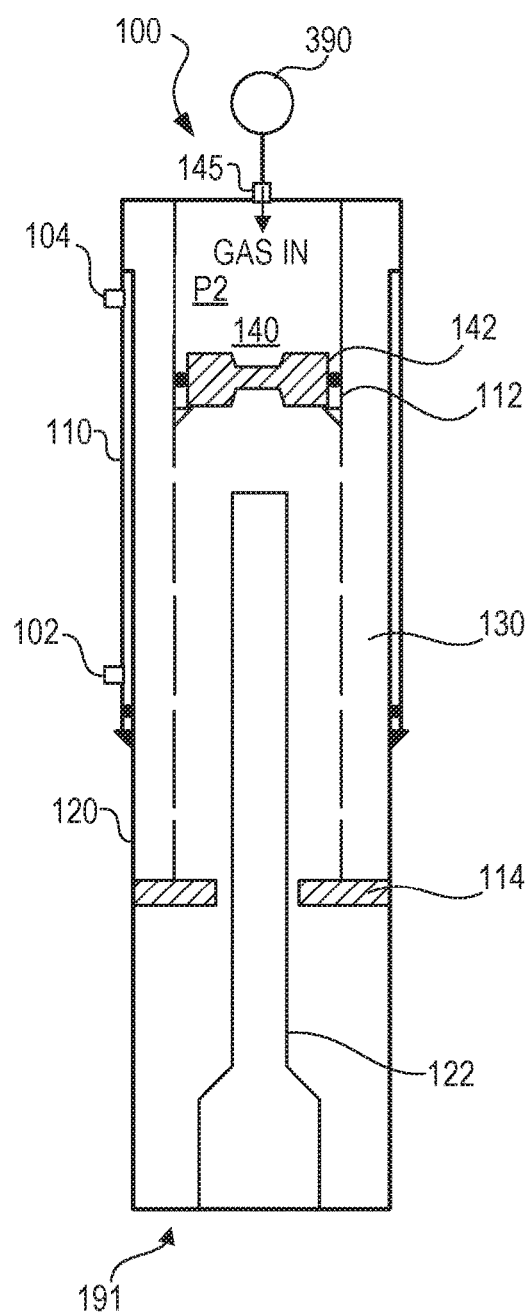
FIG. 3C illustrates a schematic view of the dual-stage, mixed gas/fluid shock strut with the secondary chamber charged with compressed gas to a secondary chamber pressure as specified by a secondary chamber pressure servicing chart, in accordance with various embodiments.

Method 200 may include charging the secondary gas chamber 140 with compressed gas (also referred to herein as a first quantity of compressed gas) (step 250). With combined reference to FIG. 2 and FIG. 3C, step 250 may include opening secondary chamber gas charge/discharge port 145. Secondary chamber gas charge/discharge port 145 may be opened before secondary gas chamber 140 is charged with gas. Step 250 may include connecting a compressed gas bottle 390 to secondary chamber gas charge/discharge port 145. Step 250 may include charging the secondary gas chamber 140 with compressed gas until the pressure within secondary gas chamber 140 reaches a pre-determined pressure value P2. Step 250 may include pressurizing the compressed gas to a pre-determined pressure value P2 as specified by a secondary chamber pressure servicing chart which provides secondary gas chamber pressure values P2 for various temperatures, such as secondary chamber pressure servicing chart 400, with momentary reference to FIG. 4. Secondary gas chamber 140 may be charged to a pressure P2 corresponding to the measured temperature described in step 240. Step 250 may include opening primary chamber charge/discharge port 104 prior to charging secondary gas chamber 140 with gas, in accordance with various embodiments. Opening primary chamber charge/discharge port 104 may allow excessive oil in primary chamber 130 to exit primary chamber 130 as separator piston 142 moves towards first end 191, with momentary reference to FIG. 1B.

Figure 3D:
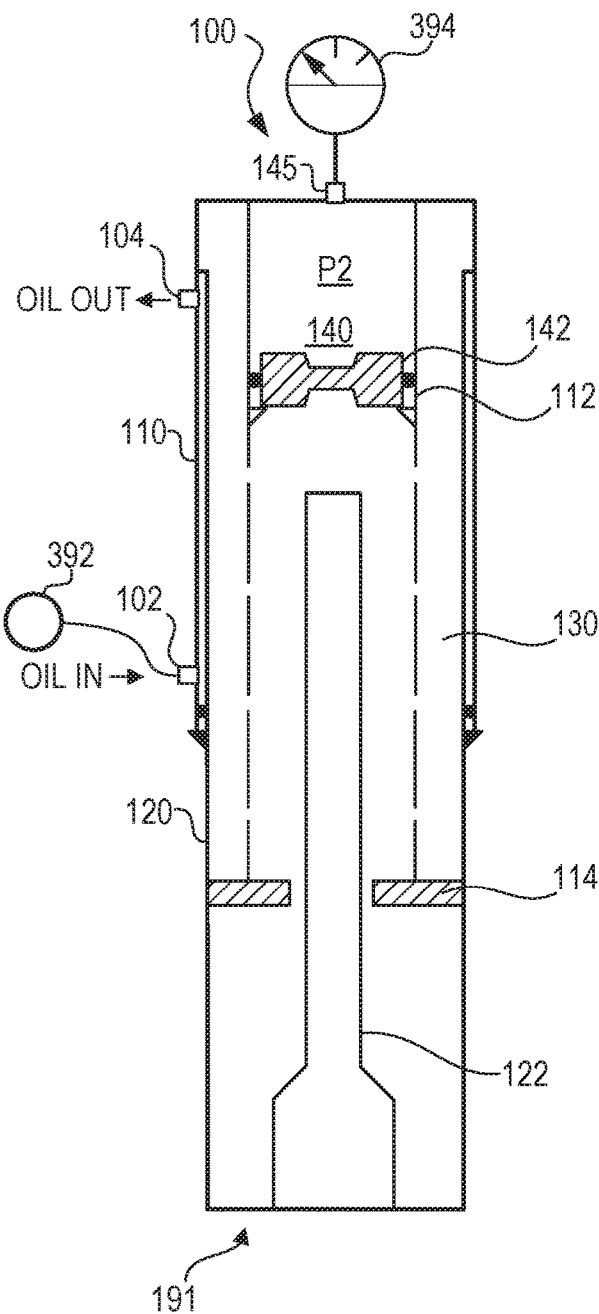
FIG. 3D illustrates a schematic view of the dual-stage, mixed gas/fluid shock strut with an oil pump circulating oil through a primary chamber of the shock strut, in accordance with various embodiments.

With reference to FIG. 4, it is noteworthy that secondary chamber pressure servicing chart 400 depicts only three temperatures and that a secondary chamber pressure servicing chart 400 may provide any number of temperatures to provide a finer resolution of temperature versus pressure values. Moreover, the pressure set-points at various servicing temperatures may be determined based on a nominal inflation pressure of the secondary gas chamber 140 at 20° C. (68° F.), by taking real gas properties, of nitrogen for example, into account. Pressure set-points may vary from one shock strut to another based upon shock strut design. With combined reference to FIG. 2 and FIG. 3C, step 250 may include closing secondary chamber gas charge/discharge port 145 after the secondary gas chamber 140 has been charged to the pre-determined pressure value P2. Step 250 may include connecting a pressure gauge 394 to secondary chamber gas charge/discharge port 145 (see FIG. 3D).

Method 200 may include pumping oil into the shock strut (step 260). Step 260 may include opening oil fill port 102. Step 260 may include opening primary chamber charge/discharge port 104. Step 260 may include connecting a high pressure oil servicing pump 392 to oil fill port 102. Step 260 may include pumping oil through primary chamber 130. Step 260 may include circulating oil through primary chamber 130 to remove gas from the primary chamber 130. In this regard, the oil may enter oil fill port 102 and exit primary chamber charge/discharge port 104. Oil may be circulated through primary chamber 130 until no gas bubbles are observed exiting primary chamber charge/discharge port 104. For example, a transparent hose may be connected to primary chamber charge/discharge port 104 to observe if any gas bubbles are disposed in the oil exiting primary chamber charge/discharge port 104.

Figure 5A:
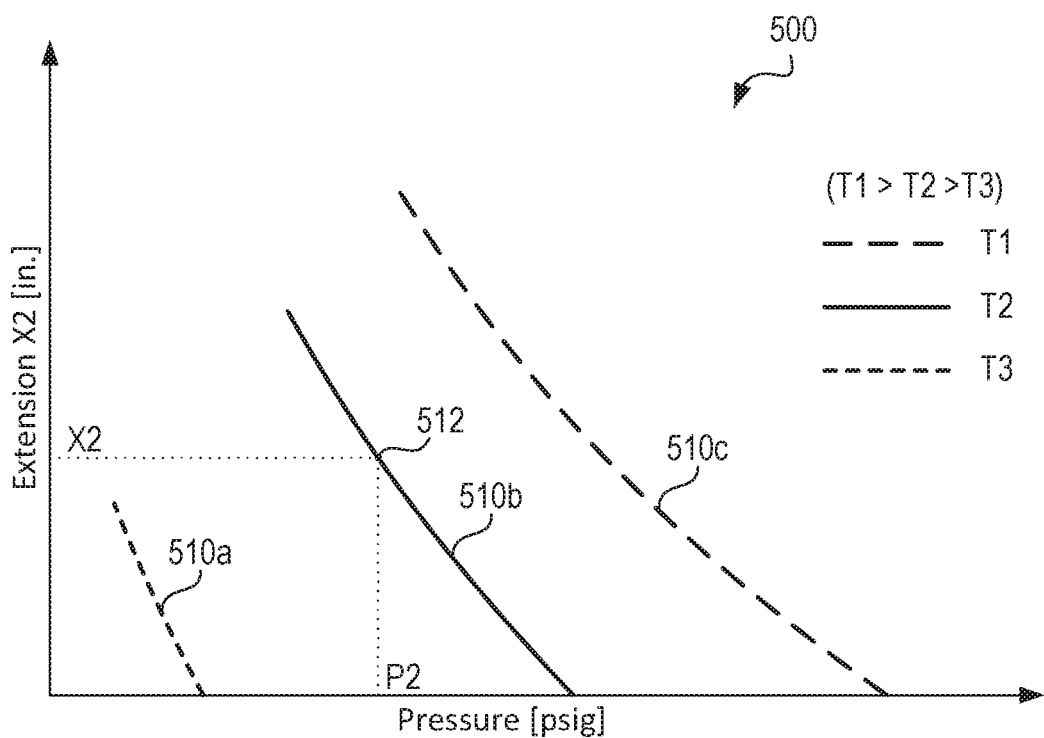
FIG. 5A illustrates primary chamber oil servicing reference curves, in accordance with various embodiments.

With combined reference to FIG. 2, FIG. 3E, and FIG. 5A, if step 260 is performed WONW, step 260 may include closing primary chamber charge/discharge port 104 and pumping oil into primary chamber 130 until the shock strut extends and the pressure (i.e., P2) within secondary gas chamber 140 and the shock strut extension (i.e., X2) values match the oil servicing reference curve (i.e., oil servicing reference curve 510a, oil servicing reference curve 510b, or oil servicing reference curve 510c) corresponding to the servicing temperature measured in step 240. Stated differently, step 260 may include pumping oil into primary chamber 130 until the shock strut extends to a shock strut extension (i.e., X2) corresponding to the secondary chamber pressure (i.e., P2), as indicated by an oil servicing reference curve provided in servicing chart 500. For example, if the servicing temperature is equal to temperature T2 of servicing chart 500, then oil may be pumped into primary chamber 130 until the shock strut extends to a shock strut extension (also referred to herein as a first shock strut extension) X2 corresponding to the secondary chamber pressure P2, for example shown at 512. In various embodiments, shock strut extension X2 may be referred to herein as a first shock strut extension.

With combined reference to FIG. 2, FIG. 3F, and FIG. 5A, if step 260 is performed WOFFW, step 260 may include leaving primary chamber charge/discharge port 104 open and using servicing tool 352 to extend the shock strut 100, whilst circulating oil through primary chamber 130, until the shock strut extends to a shock strut extension (i.e., X2) such that the pressure (i.e., P2) within secondary gas chamber 140 and the shock strut extension (i.e., X2) values match the associated oil servicing reference curve in servicing chart 500 (i.e., oil servicing reference curve 510a, oil servicing reference curve 510b, or oil servicing reference curve 510c). Since, in this case, the primary chamber charge/discharge port 104 is open, the pressure P2 in secondary gas chamber 140 may remain at the set-point specified in step 250, and thus the shock strut servicing tool is used to extend the shock strut to extension X2. Once extension X2 is achieved, primary chamber charge/discharge port 104 may be closed and oil may be pumped, via high pressure oil servicing pump 392, into primary chamber 130, until the pressure in primary chamber 130 (i.e., P1) reaches a pre-determined value, such as pressure P2, while shock strut extension is maintained with the servicing tool. In this regard, if step 260 is performed WOFFW, oil may be pumped, via high pressure oil servicing pump 392, into primary chamber 130, until the pressure in primary chamber 130 (i.e., P1) is equal to the pressure P2 of gas in secondary gas chamber 140, or other pre-determined pressure in accordance with various embodiments. In various embodiments, the pressure P2 in secondary gas chamber 140 may remain at the set-point value as specified in step 240.

In various embodiments, step 260 may include closing the secondary chamber gas charge/discharge port 145 and removing the pressure gauge 394 from the secondary gas chamber 140. Step 260 may include closing the oil fill port 102 and removing the high pressure oil servicing pump 392 from the primary chamber 130.

With reference to FIG. 5A, each oil servicing reference curve 510a, 510b, 510c may be derived as a function of servicing temperature and can be provided to an operator in the form of a series of curves or a series of tables for various servicing temperatures. Oil bulk modulus, oil thermal expansion/contraction, servicing temperature, shock strut design parameters, secondary gas chamber inflation pressure, and/or real gas properties may be taken into account in deriving each oil servicing reference curve 510a, 510b, 510c. Moreover, the Y-axis (i.e., the extension axis) on the oil servicing reference curve may be adjusted by the possible difference between the nominal and actual values for shock strut extension in the fully extended position.

Figure 3G:
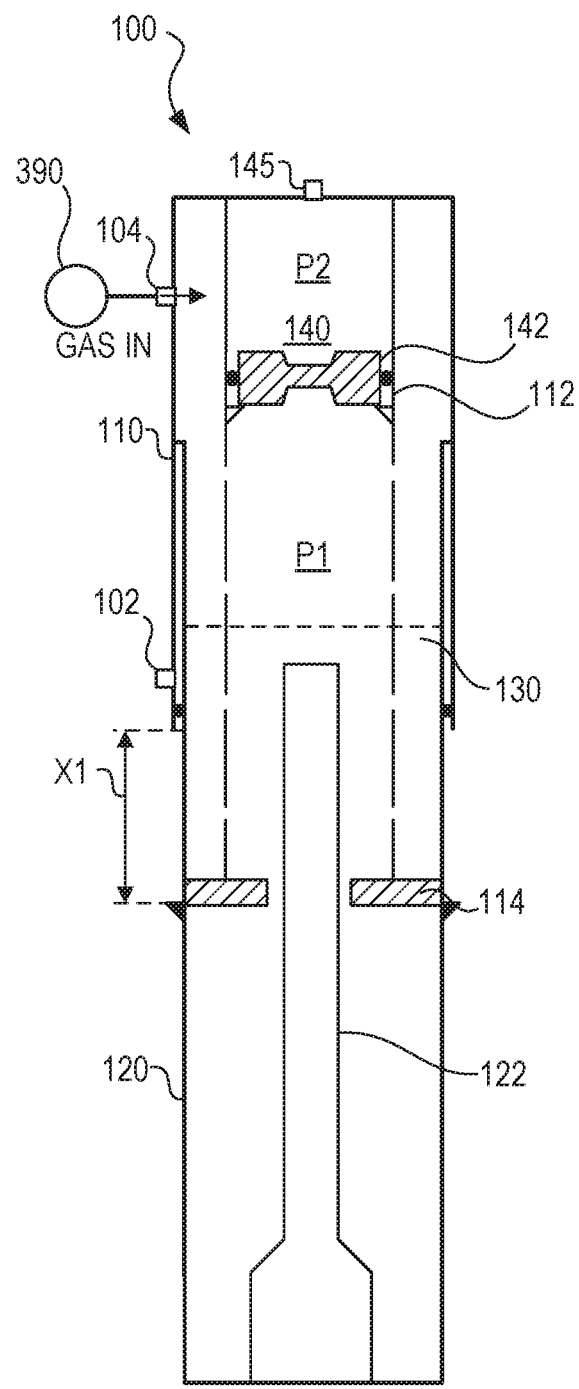
FIG. 3G illustrates a schematic view of the dual-stage, mixed gas/fluid shock strut with a gas bottle coupled to the primary chamber and having pressurized the primary chamber to a primary chamber pressure P1 and the shock strut extended to an extension X1, in accordance with various embodiments.
Figure 5B:
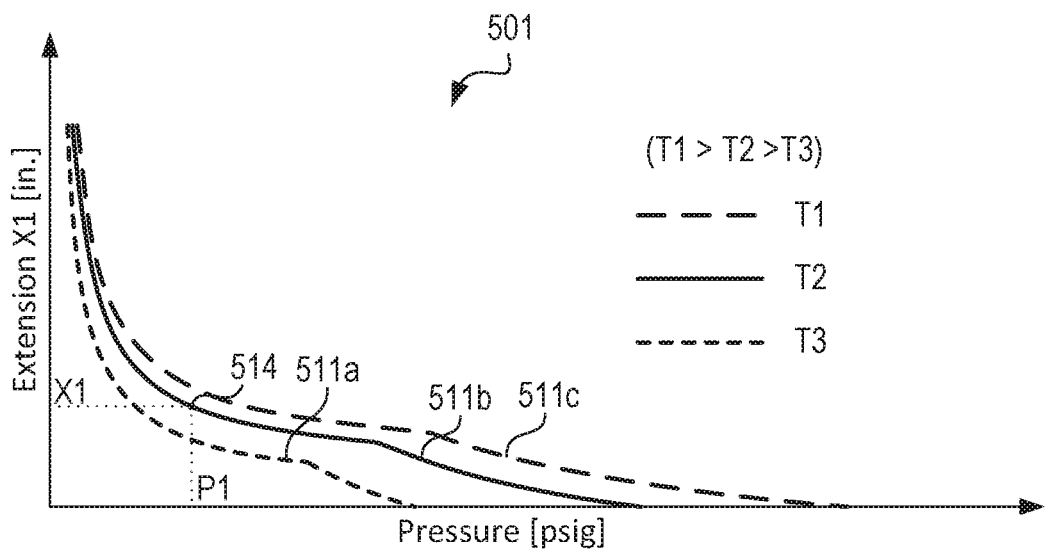
FIG. 5B illustrates primary chamber gas servicing reference curves, in accordance with various embodiments.

With combined reference to FIG. 2, FIG. 3G, and FIG. 5B, method 200 may include charging the primary chamber with compressed gas (also referred to herein as a second quantity of compressed gas) (step 270). Step 270 may include connecting gas bottle 390 to primary chamber charge/discharge port 104. Step 270 may include charging primary chamber 130 with compressed gas (such as nitrogen for example), via gas bottle 390. Step 270 may include charging primary chamber 130 with compressed gas until the primary chamber pressure P1 and the shock strut extension (also referred to herein as a second shock strut extension) X1 match the corresponding gas servicing reference curve, for example as shown at 514 in FIG. 5B. Stated differently, step 270 may include charging primary chamber 130 with compressed gas until the primary chamber pressure P1 corresponds to the shock strut extension X1 as indicated by the associated gas servicing reference curve (e.g., gas servicing reference curve 511a, gas servicing reference curve 511b, or gas servicing reference curve 511c) of a servicing chart 501 (see FIG. 5B). In various embodiments, shock strut extension X1 may be referred to herein as a second shock strut extension.

If step 270 is performed WOFFW, the servicing tool may be removed to allow the shock strut 100 to extend to the fully extended position. In various embodiments, the shock strut 100 may automatically extend to the fully extended position in response to the servicing tool being removed due to the pressure inside shock strut 100 acting on strut piston 120. The primary chamber 130 may be filled with gas until the primary chamber pressure P1 and the shock strut extension, in the fully extended position, match the associated gas servicing reference curve (e.g., gas servicing reference curve 511a, gas servicing reference curve 511b, or gas servicing reference curve 511c) (see FIG. 5B).

With reference to FIG. 5B, gas servicing reference curves 511a, 511b, 511c may be derived as a function of servicing temperature and can be provided to an operator in the form of a series of curves or a series of tables for various servicing temperatures. Oil bulk modulus, oil thermal expansion/contraction, servicing temperature, shock strut design parameters, secondary chamber inflation pressure, and/or real gas properties may be taken into account in deriving each gas servicing reference curve 511a, 511b, 511c. Moreover, the Y-axis on the gas servicing reference curve may be adjusted by the possible difference between the nominal and actual values for shock strut extension in the fully extended position.

Step 270 may include closing the primary chamber charge/discharge port 104 and removing the gas bottle 390 from the primary chamber 130.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for servicing a dual-stage, mixed gas/fluid shock strut, comprising:

measuring a servicing temperature;

charging a secondary gas chamber with a first quantity of compressed gas, wherein a secondary chamber pressure corresponds to the servicing temperature;

pumping an oil into a primary chamber of the dual-stage, mixed gas/fluid shock strut until the secondary chamber pressure matches a primary chamber oil servicing reference curve; and charging the primary chamber with a second quantity of compressed gas.

2. The method of claim 1, wherein the primary chamber is charged with the second quantity of compressed gas until the secondary chamber pressure corresponds to the servicing temperature as indicated by a secondary chamber pressure servicing chart.

3. The method of claim 2, further comprising extending the dual-stage, mixed gas/fluid shock strut in response to the pumping, wherein the dual-stage, mixed gas/fluid shock strut extends such that a shock strut extension and the secondary chamber pressure match the primary chamber oil servicing reference curve.

4. The method of claim 1, further comprising extending the dual-stage, mixed gas/fluid shock strut to a shock strut extension corresponding to the secondary chamber pressure, in accordance with the primary chamber oil servicing reference curve, wherein the oil is pumped into the dual-stage, mixed gas/fluid shock strut until a primary chamber pressure is equal to the secondary chamber pressure.

5. The method of claim 3, wherein the primary chamber oil servicing reference curve is provided in the form of at least one of a series of curves or a series of tables for various servicing temperatures.

6. The method of claim 1, wherein the primary chamber is charged with the second quantity of compressed gas until a primary chamber pressure and a shock strut extension corresponds to a gas servicing reference curve.

7. The method of claim 1, further comprising releasing an existing gas from the primary chamber.

8. The method of claim 1, further comprising releasing an existing gas from the secondary gas chamber.

9. The method of claim 1, further comprising releasing an existing oil from the primary chamber.

10. A method for servicing a dual-stage, mixed gas/fluid shock strut, comprising:

charging a secondary gas chamber with a first quantity of compressed gas, wherein a secondary chamber pressure corresponds to a servicing temperature;

pumping oil into a primary chamber of the dual-stage, mixed gas/fluid shock strut, wherein the dual-stage, mixed gas/fluid shock strut extends in response to oil being pumped into the primary chamber until a first shock strut extension and the secondary chamber pressure match a primary chamber oil servicing reference curve; and charging the primary chamber with a second quantity of compressed gas until a second shock strut extension and a primary chamber pressure match a gas servicing reference curve.

11. The method of claim 10, wherein at least one of the oil servicing reference curve and the gas servicing reference curve correspond to the servicing temperature.

12. The method of claim 10, further comprising measuring the servicing temperature.

13. The method of claim 10, further comprising:
releasing a first existing gas from the primary chamber; and
releasing a second existing gas from the secondary gas chamber.

14. The method of claim 10, further comprising draining an existing oil from the primary chamber.

15. A method for servicing a dual-stage, mixed gas/fluid shock strut, comprising:

charging a secondary gas chamber with a first quantity of compressed gas, wherein a secondary chamber pressure corresponds to a servicing temperature;

circulating oil through a primary chamber of the dual-stage, mixed gas/fluid shock strut via an oil charge port and an oil bleed port;

extending the dual-stage, mixed gas/fluid shock strut, using a servicing tool, to a first shock strut extension corresponding to the secondary chamber pressure according to an oil servicing reference curve;

closing the oil bleed port;

pumping the oil into the primary chamber until the secondary chamber pressure reaches a pre-determined pressure;

closing the oil charge port;

extending the dual-stage, mixed gas/fluid shock strut to a fully extended position; and charging the primary chamber with a second quantity of compressed gas until a second shock strut extension and a primary chamber pressure match a gas servicing reference curve.

16. The method of claim 15, wherein at least one of the oil servicing reference curve and the gas servicing reference curve correspond to the servicing temperature.

17. The method of claim 15, further comprising measuring the servicing temperature.

18. The method of claim 15, wherein the pre-determined pressure is equal to the secondary chamber pressure.

19. The method of claim 15, further comprising:
releasing a first existing gas from the primary chamber; and
releasing a second existing gas from the secondary gas chamber.

20. The method of claim 15, further comprising draining an existing oil from the primary chamber.

* * * * *